US007654492B2

(12) United States Patent
Balderama et al.

(10) Patent No.: US 7,654,492 B2
(45) Date of Patent: Feb. 2, 2010

(54) WIRE BUNDLE SUPPORT SYSTEM

(75) Inventors: Mark Balderama, Pomona, CA (US); Thomas A. Holum, Clinton, WA (US); Lenny E. Lay, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 922 days.

(21) Appl. No.: 10/838,049

(22) Filed: May 3, 2004

(65) Prior Publication Data

US 2005/0242245 A1 Nov. 3, 2005

(51) Int. Cl.
*F16L 3/00* (2006.01)
(52) U.S. Cl. .............................. 248/72; 248/73; 248/75; 248/74.2
(58) Field of Classification Search ................ 248/68.1, 248/74.3, 74.2, 74.4, 74.5, 58, 65, 72, 73, 248/49, 75, 77
See application file for complete search history.

(56) References Cited

U.S. PATENT DOCUMENTS

| 3,602,473 | A | * | 8/1971 | Van Riet et al. ............. 248/317 |
| 4,347,998 | A | * | 9/1982 | Loree ......................... 248/68.1 |
| 4,395,009 | A | | 7/1983 | Bormke |
| 4,679,754 | A | * | 7/1987 | Richards ..................... 248/68.1 |
| 4,934,885 | A | | 6/1990 | Woods et al. |
| 4,979,544 | A | | 12/1990 | Swindlehurst |
| 5,816,542 | A | * | 10/1998 | Rinderer ....................... 248/58 |
| 5,943,744 | A | * | 8/1999 | Norte ........................... 24/458 |
| 6,100,471 | A | * | 8/2000 | Fouache ..................... 174/72 C |
| 6,272,387 | B1 | | 8/2001 | Yoon |
| 6,272,722 | B1 | * | 8/2001 | Lai .............................. 24/458 |
| 6,463,631 | B2 | * | 10/2002 | Noda ......................... 24/16 R |
| 6,554,639 | B2 | | 4/2003 | Doriski, Jr. |
| 7,066,866 | B1 | * | 6/2006 | Mobley ........................ 482/40 |

\* cited by examiner

*Primary Examiner*—J. Allen Shriver
*Assistant Examiner*—Steven Marsh
(74) *Attorney, Agent, or Firm*—Alston & Bird LLP (57) ABSTRACT

A support system for an elongate object comprising an elongate support bar, a tower member, and a stackable riser for securing the elongate object to the tower member.

25 Claims, 6 Drawing Sheets

WIRE BUNDLE SUPPORT SYSTEM

BACKGROUND

The present invention relates to support systems. More specifically, the present invention relates to a support system for securing elongate objects, such as electrical wires, tubes, and hoses.

Many types of mounting devices have been developed over the years for holding one or more elongate objects to a support. One of the more popular devices for use in vehicles, including automobiles and airplanes, has been the "P" clamp. The P-clamp includes a metal strap formed into a generally circular portion with each end of the strap terminating in a flat foot portion. After elongate objects are encircled by the circular portion, the feet are overlapped until apertures in the feet are aligned to receive a threaded fastener. Unfortunately, P-clamps suffer from numerous disadvantages. Foremost, P-clamps are generally not adjustable so that when they are used in an environment where different sizes of bundles have to be accommodated, a large inventory of different sized P-clamps must be maintained. Also, it is difficult to achieve a predetermined tension on the held objects, and thus it is sometimes necessary to use additional fillers or spacers to encircle the objects to provide consistent compressive forces. The P-clamp has changed very little over the years, which is surprising considering the various problems associated with use. Most assemblers agree that the installation of these clamps is difficult because of their stiffness. Furthermore, the use of commercially available P-clamps on electrical cables is complicated by the fact that electrical cable diameter dimensions are not tightly controlled and that cables have soft, irregular cross-sections which can be damaged by excessive force caused by securing with a P-clamp. Accordingly, current methods of fastening wires, tubes, and hoses to an aircraft or other structure involve the use of thousands of individual parts that are only slightly different from one another. This creates a huge inventory of parts and drawings. If a fit problem occurs during installation, the parts must be swapped pursuant to existing engineering guidelines, or corrective action paperwork must be generated to address the discrepancy, thus creating more unique parts and drawings.

Tie straps, also referred to as cable ties, have been widely used for bundling wires, and for securing such wires to a support. The tie strap structure includes a flexible tie for circling a bundle and a buckle at one end of the tie to lock the tie strap structure into a loop. Various mounts have been developed for securing the tie strap and bundle of wires to a support. The mounts include one or more windows or slots for receiving one end of the tie strap, which is then looped back upon itself to be attached by the tie strap's buckle. The mounts are then affixed to a support surface by threaded fasteners or adhesive.

Advantageously, tie straps have adjustable diameters to accommodate bundles having a wide variety of diameters. Accordingly, such fasteners typically do not require fillers to provide consistent compressive forces upon objects to be bundled. Unfortunately, presently available mounts for tie straps require that both sides of the mount be accessible for entry and exit of the strap. Further, such mounts require the additional component of an adhesive or of a threaded fastener to secure the mount to a support surface, thereby requiring that an additional inventory of components be maintained.

Certain improvements have been made to secure elongate objects using tie straps. For example, co-pending U.S. application Ser. No. 10/210,578, which is assigned to the assignee of the present application, describes a ring-post fastener providing a ring having a plurality of radially extending spokes that define a corresponding number of slots therebetween. The plurality of slots are sized for receipt and passage of a conventional tie strap. While such improvements provide welcome advantages over conventionally available fasteners, such as P-clamps, further improvements can be made. In particular, there is a need for a robust support system for securing wires, tubes, and the like over long distances, such as in the raceways, main runs, and crowns of an aircraft. There is also a need for a universal or featureless support system that is capable of securing wires, tubes and hoses of varying diameters. Furthermore, there is a need for a support system that reduces inventory, assembly time, and installation time.

BRIEF SUMMARY

These and other needs are fulfilled by the support system described herein. The present support system is particularly advantageous for bundling and securing "family groups" of wires that are typically found in aircraft, boats, and other vehicles. By providing a post having a plurality of registration positions along the length thereof, the stackable riser can be positioned at a predetermined or desired height according to the registration positions, and multiple stackable risers can be arranged on a common post to organize and secure stacks or layers of wires, tubes, or other elongate objects. Advantageously, the support system is designed to receive a securing device, such as a cable tie, in conjunction with the stackable riser and/or tower member such that elongate objects of various diameters can be secured to the support system. As such, the support system acts as a "universal" system that greatly reduces part inventory, assembly time, and installation time.

More specifically, the present support system according to one embodiment includes an elongate support bar having opposing ends that define a length therebetween. The elongate support bar is secured to a more permanent structure, such as the fuselage of an aircraft, by a locking device having an anchor member and one or more connector members. The connector members releasably secure the support bar, such as in a snap-fit relationship, and the connectors and support bar are secured to the anchor member, which is secured to the more permanent structure.

The support system also includes a tower member that is releasably secured to the support bar. The tower member has a base and a post extending therefrom. The base is designed to engage the support bar, and in one embodiment includes opposing sides that fit over the sides of the support bar. In one embodiment, the base of the tower member also includes a tab that extends toward the support bar and into one of a plurality of depressions or openings defined by the support bar, such that the tower member is prevented from sliding along the length of the support bar. A clip may also be used that extends through the sides of the tower member to help keep the tower member secured to the support bar. In another embodiment, the sides of the tower member base are designed to extend past the corresponding sides of the support bar and include respective grip edges that engage the lower side edges of the support bar for releasably securing the tower member to the support bar. The post of the tower member defines a plurality of registration positions along the length of the post that, according to one embodiment, are openings defined in the post.

The support system also includes a stackable riser having a registration member, such as a pin, that is designed to releasably secure the stackable riser to the post at one of the registration positions defined by the post. According to one embodiment, the registration pin of the stackable riser can extend through the opening defined by the post to secure the stackable riser to the post. The stackable riser may also include at least one support arm that extends away from the post and is designed to support the elongate object. The stackable riser may also include an attachment member that also serves to support the elongate object, but also defines a recess or channel between the attachment member and the support arm for receiving a securing device, such as a cable tie, which is also looped around the elongate object to secure the elongate object to the stackable riser.

Methods of supporting an elongate object are also provided. In one embodiment, an elongate support bar is provided, and a tower member is releasably secured thereto utilizing some or all of the structures and arrangements described above. One method also includes releasably securing a stackable riser at a selected one of the registration positions defined along the tower member post, and securing the elongate object to the stackable riser and/or the tower member. In particular, the tower member and/or the stackable riser may include an attachment member that helps define a recess for receiving a securing device and securing the elongate object to the stackable riser and/or the tower member. In one embodiment, the stackable riser is secured to the tower member post by engaging a registration member with the tower member post at the selected registration position defined by the post.

Accordingly, the support system described herein provides many advantages for supporting and securing elongate objects that have heretofore been performed in less than desirable manners. The support system provides a universal system that allows quick and simple installation and assembly of the system components, yet allows for a broad range of elongate objects to be safely and securely fastened. Further advantages will be apparent when considered in light of the following detailed description and claims.

BRIEF DESCRIPTION OF THE SEVERAL VIEWS OF THE DRAWING(S)

Having thus described the present support system in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
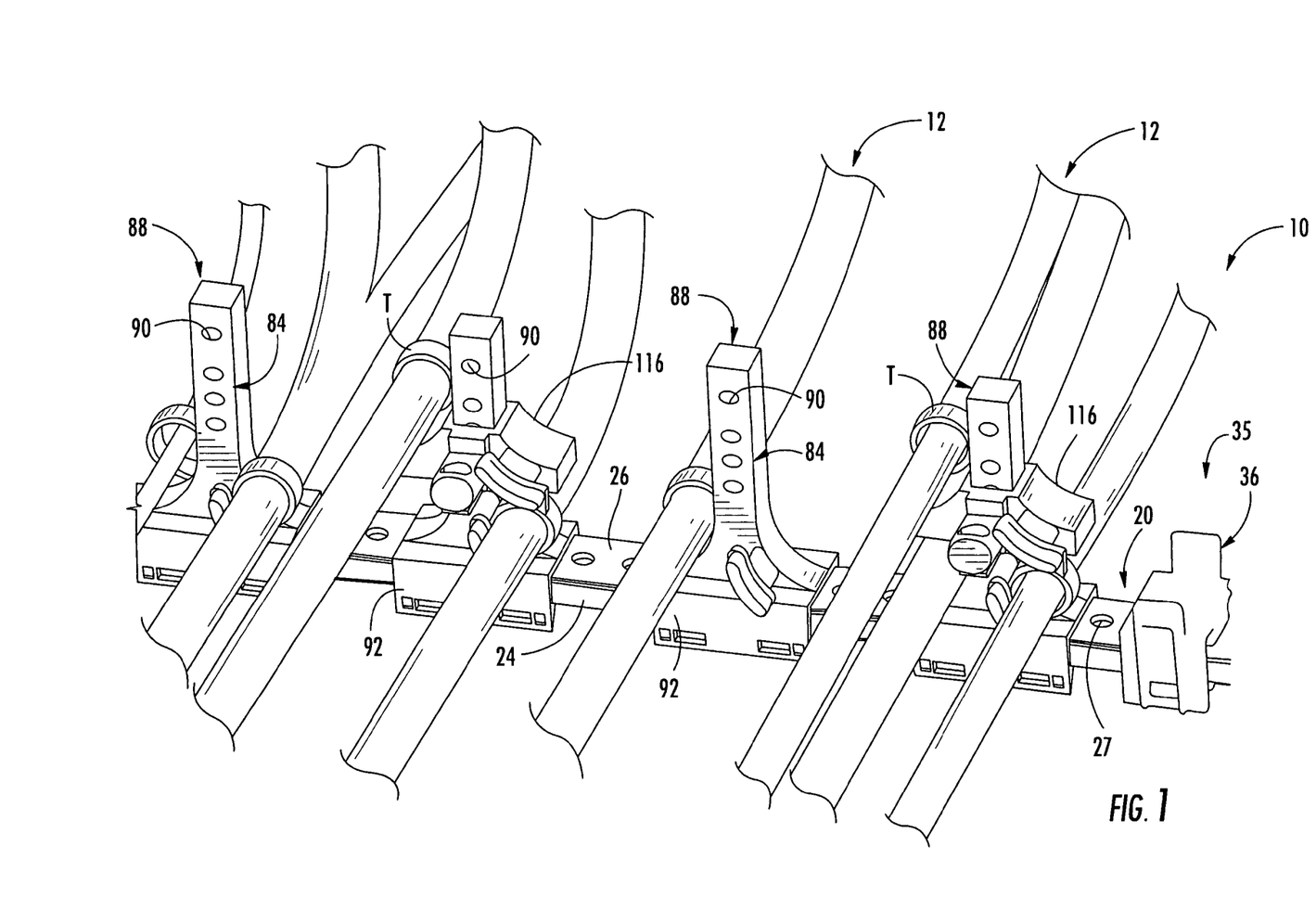
FIG. 1 is a perspective view of a support system according to one embodiment of the present invention.

Turning now to the Figures, FIG. 1 shows a support system 10 for engaging and securing a plurality of elongate objects 12. The elongate objects 12 may be different types of wires, cables, pipes, conduits, or any other elongate objects, tubular or of other cross section, that extend over an elongate path, such as along the raceways, main runs, or in the crown of an aircraft or other vehicle. The support system 10 may also be utilized in non-vehicular settings, such as in office ceilings, crawl spaces in a home, or any other location where it is desired to secure the elongate objects, and particularly when elongate objects of differing diameters extend along a common path. As shown in FIG. 1, the various elongate objects secured by the support system 10 have varying diameters, yet the parts of the support system to be described herein have a common shape and size and thus can be considered "universal" by their ability to support and secure a wide variety of elongate objects, such as elongate objects with varying diameters, without requiring a large number of different part types and sizes.

Figure 2:
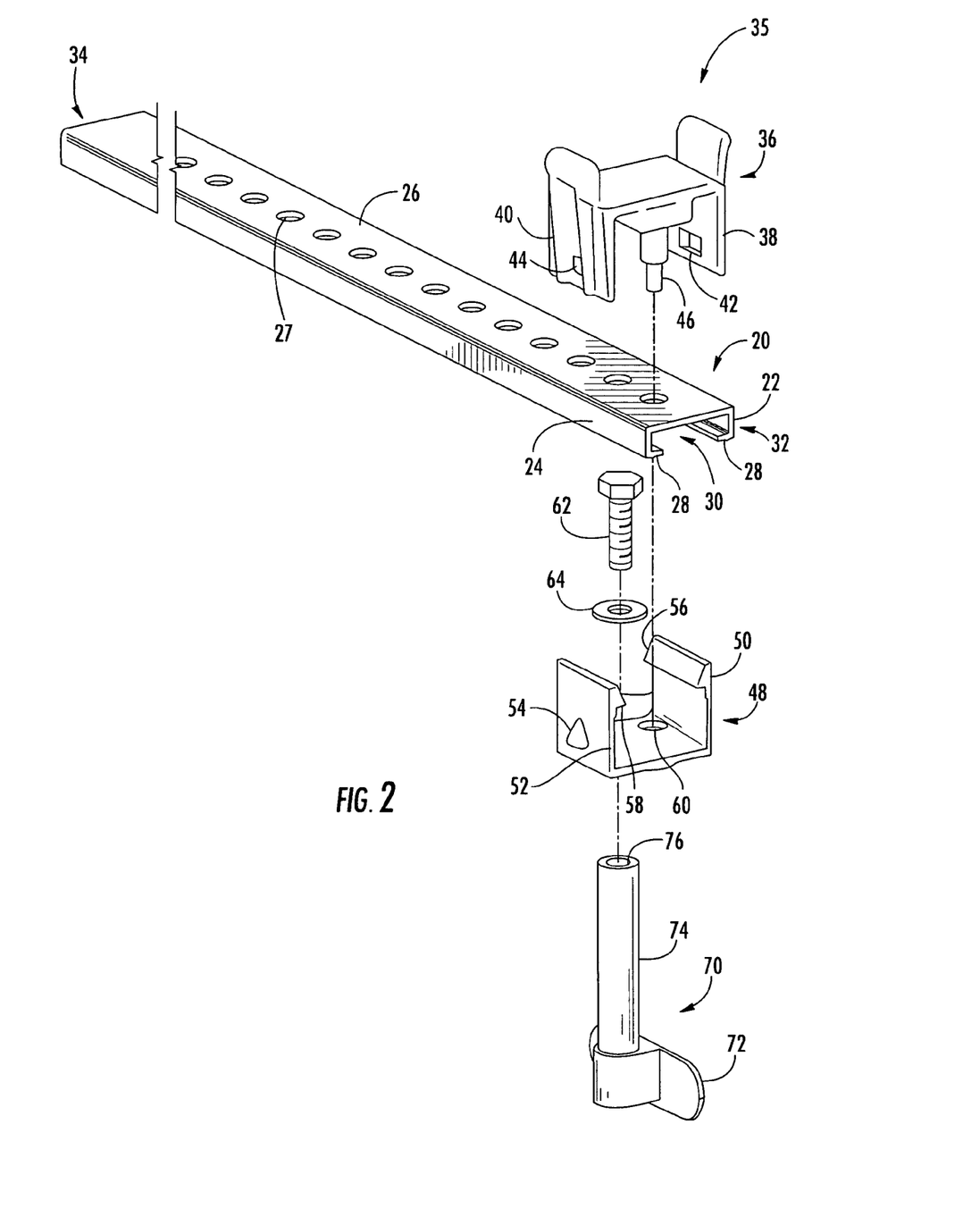
FIG. 2 is an exploded perspective view of a locking device and support bar according to one embodiment of the present invention.
Figure 3:
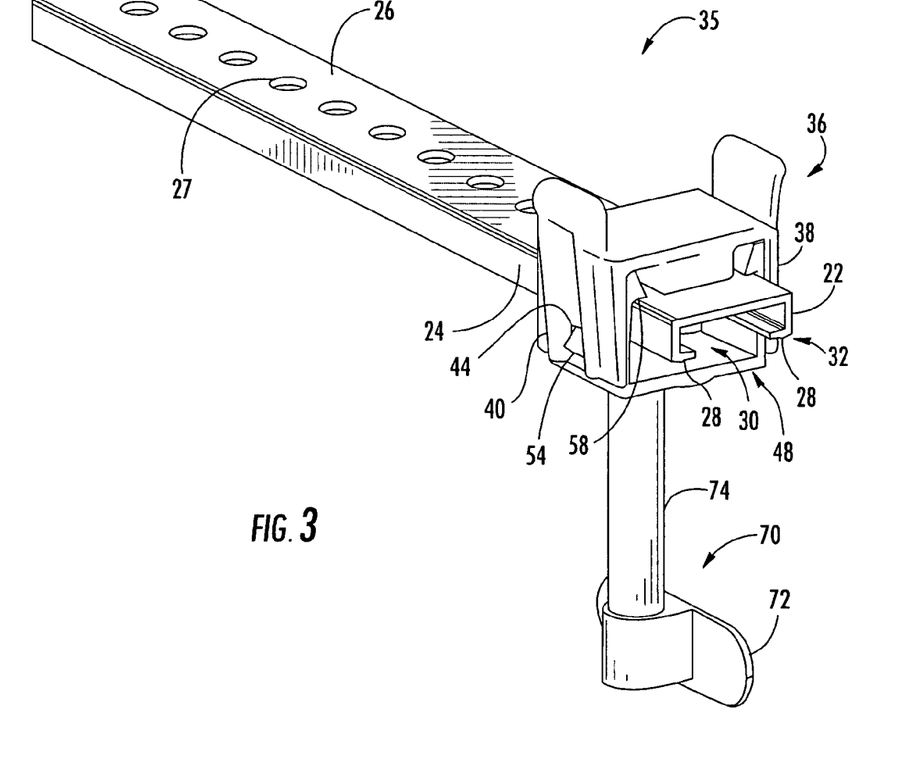
FIG. 3 is a perspective view of the assembled locking device and support bar shown in FIG. 2.

Turning to FIGS. 1-3, the support system 10 includes an elongate support bar 20 that extends across a passageway or space and is secured to a more permanent object, such as the fuselage of an aircraft or other support surface capable of withstanding the load of the support system and the elongate objects being held thereby. The support bar 20 typically may be made of titanium or aluminum, but any material capable of supporting the associated loads of the elongate objects is acceptable, including but not limited to metals and alloys thereof, carbon fiber, composites, and combinations thereof. The elongate support bar 20 can have many shapes and sizes, including polygonal, round, elliptical, and the like, and in FIGS. 1-3 the support bar is shown as a "U" shaped bar having opposing sides 22 and 24 that are spaced apart by a transverse wall 26, which defines a plurality of registration points, such as depressions, apertures, or openings 27 as shown in the figures. The support bar 20 may also include lower side edges 28 such that the support bar 20 defines a channel 30. The support bar 20 may also form a hollow elongate structure or can be primarily solid depending on the application. The support bar 20 also includes opposing ends 32 and 34 that define a length therebetween. In one embodiment, a support bar is approximately 18 inches long, although the length of the support bar can vary from a few inches to several feet or more depending upon the application. In addition, the support bar 20 may be linear as shown, but may have other, non-linear configurations if so desired.

According to one embodiment, the support bar 20 is secured to the vehicle or other desirable surface or object by a locking device 35. More specifically, the locking device 35 is secured to a structural member, surface, or object by means of a threaded bolt 62. As shown, the locking device 35 may also include an anchor member 70 having a base 72 that is secured to the vehicle or other surface by one or more means, including adhesives, fasteners, bolts, screws, and other connectors known in the art. The anchor member 70 also includes a shaft 74 extending from the base 72 that defines an opening 76 for receiving the threaded screw or bolt 62, although the threaded bolt may be secured directly into a structural member as described above. The locking device 35 also includes a first connector member 36 and a second connector member 48 that are designed to releasable secure the support bar 20 therebetween and also to releasably secure the support bar to the anchor member 70 or other structural member. In particular, the first connector member 36 includes opposing sidewalls 38 and 40 that are spaced apart in order to fit over at least the opposing sides 22 and 24 of the support bar 20. The opposing sides 38 and 40 define respective openings 42 and 44 for receiving locking tabs, as discussed below. The first connector member also includes a projection 46 that is sized to fit within the openings 27 of the transverse wall 26 and extend therethrough to meet the second connector member. It should be noted that the shape of the anchor member 70 can have many configurations, and the design shown in the figures is only one exemplary configuration.

The second connector member 48 includes opposing sidewalls 50 and 52 that are spaced to fit over the side edges 22 and 24 of the support bar 20. The second connector member 48 also includes a pair of locking tabs 56 and 58 that are designed to bias the sidewalls 50 and 52 outwardly and then engage the transverse wall 26 of the support bar 20 in a snap-fit relationship to secure the second connector member to the support bar. The second connector member 48 also defines an opening 60 for receiving the projection 46 of the first connector member and defines an opening (not shown) for receiving the threaded bolt 62 in order to secure the second connector member to the anchor member 70 or structural member. A washer 64 may also be used in conjunction with the threaded bolt 62 in securing the second connector member 48 to the anchor member 70. The sides 50 and 52 of the second connector member also include tabs 54 extending therefrom that are designed to engage and snap into the openings 42 and 44 defined by the sides 38 and 40 of the first connector member 36.

FIG. 3 shows a snap-fit arrangement that enables the locking device 35 to secure the support bar 20 between the first and second connector members 36 and 48 and, in turn, to secure the support bar to the anchor member 70. In particular, the anchor member 70 is secured to a desired structure or surface, the second connector member 48 is secured to shaft 74 of the anchor member by the threaded bolt 62, and the support bar 20 is snapped into place over the threaded bolt until the locking tabs 56 and 58 engage the base wall 26 of the support bar. The first connector member is then pressed downwardly over the support bar 20 and second connector member 48 such that the sides 38 and 40 of the first connector member slide over the sides 50 and 52 of the second connector member, and the tabs 54 snap into place in the openings 42 and 44 defined by the sides 38 and 40 of the first connector member. In addition, the projection 46 extends through a selected one of the openings 27 defined by the support bar 20 and through the opening 60 defined by the second connector member. Because of the simple, snap-fit construction of the locking device 35, the first connector member 36 and the support bar 20 can be removed without special tools, which greatly reduces the assembly, installation and removal time. However, absent such deliberate attempts to remove the first connector member 36 and the support bar 20, the locking device securely holds and positions the support. In order to facilitate the snap-fit operation of the locking device, as well as to reduce cost, weight, and complexity, the first and second connector members 36 and 48 are preferably made of a polymeric material such as nylon.

Figure 4:
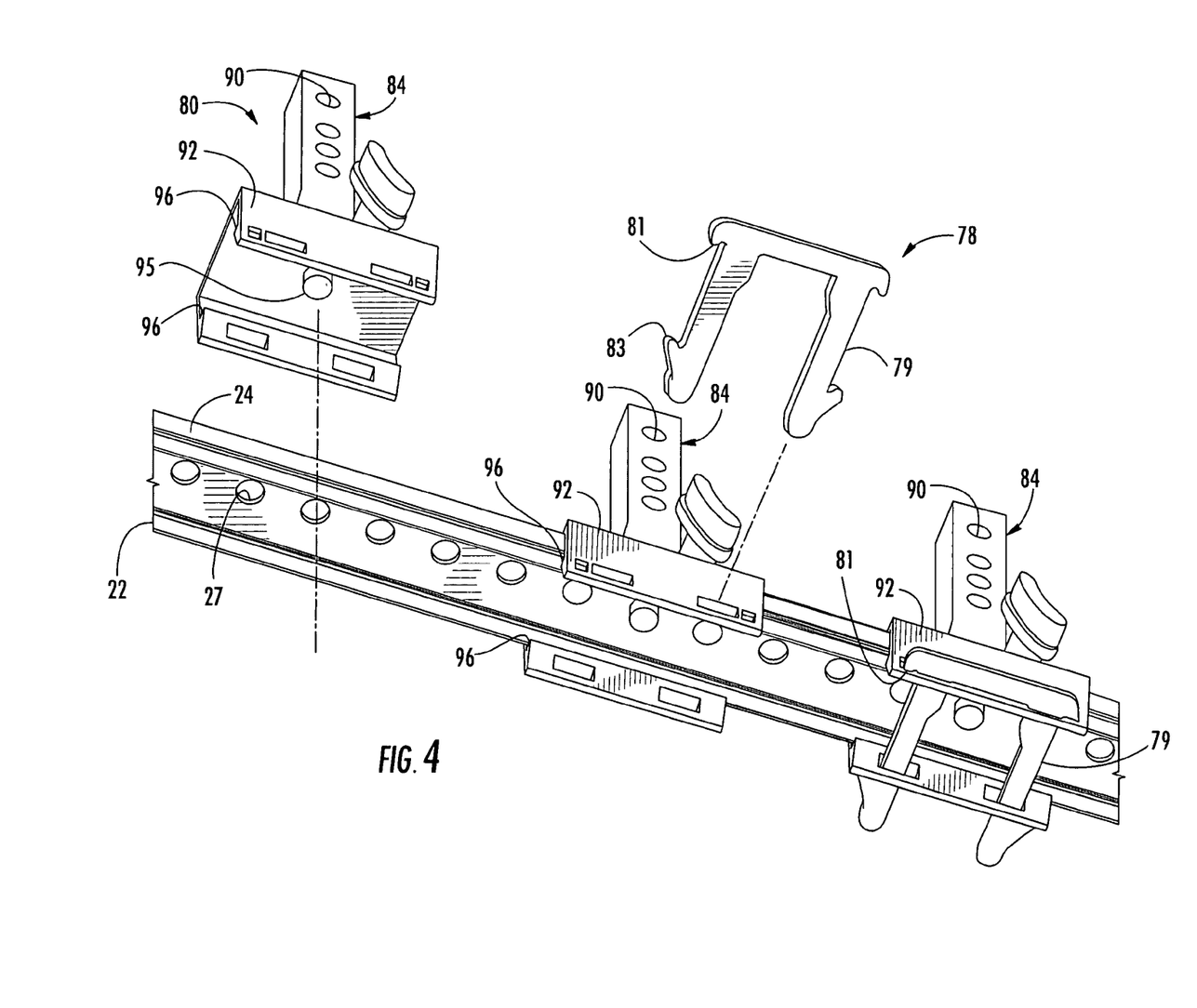
FIG. 4 is a perspective view of a support system according to one embodiment of the present invention showing three tower members in different stages of assembly with respect to the support bar.
Figure 5:
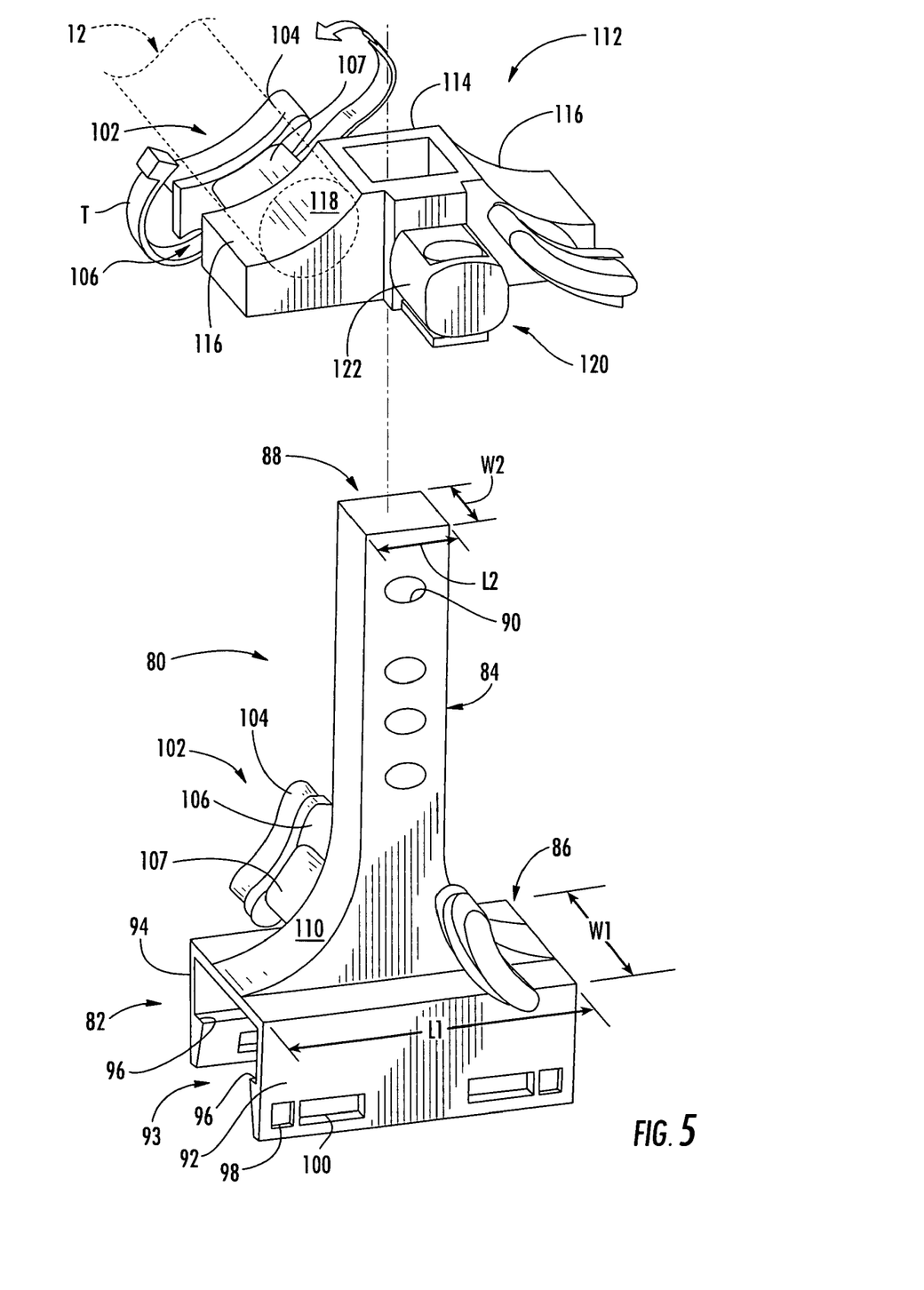
FIG. 5 is an exploded perspective view of a tower member and stackable riser according to one embodiment of the present invention.

FIG. 4 shows a perspective view of the underside of the support system 10 according to one embodiment. In particular, the support system also includes a plurality of tower members 80 that are spaced along the length of the support bar at desired intervals. In one embodiment, the support bar 20 is approximately 18 inches long, and accommodates 4-6 tower members 80 as shown in FIG. 1. However, the length of the support bar 20 may vary as well as the size and/or frequency of tower members 80 and desired spacing of the tower members along the support bar. The tower member 80 includes a base 82 and a post 84 extending therefrom. While the base 82 and 84 are shown as having generally rectangular constructions in this embodiment, one or both can have other cross-sectional shapes, with the shape of the base generally depending upon the shape of the support bar 20. As shown in FIGS. 4 and 5, the post 84 also defines a plurality of registration positions, such as openings 90 along its length between the proximate end 86 and the distal end 88. The base 82 includes sides 92 and 94 defining a channel 93 therebetween. Sides 92 and 94 may also include respective clip edges 96 for engaging the support bar 20, as discussed more fully below. Side 92 defines openings 98 and 100, and side 94 defines an opposing opening 100 for receiving a clip 78. The base 82 defines a length L1 and width W1, and the post 84 has a length L2 and width W2 that is less than L1 and W1 according to one embodiment. The post 84 includes a proximate end 86 and a distal end 88 wherein the length L2 and width W2 at the distal end 88 is less than L1 and W1, while the proximate end 86 of the post 84 defines a curved transition 110 that is designed to support the elongate objects and provide more support for the post 84. The width W1 of the base 82 is primarily dictated by the width of the support bar 20, although the length L1 of the base may vary depending on the particular needs of the system. According to one embodiment, the post 84 is approximately 2.5 inches tall, although this distance can also be varied depending on the needs of the system 10 and the material used for the system. In this embodiment, the other dimensions are as follows L1=1.5 inches; W1=1 inch; L2=0.4 inch; and W2=0.4 inch.

The tower member 80 is secured to the support bar 20 in a locking, snap-fit arrangement. In particular, the base 82 of the tower member 80 is positioned over the support bar such that a projection 95 is aligned with a selected one of the openings 27 defined by the support bar 20. The tower member 80 is then pressed onto the support bar 20 such that the projection 95 is received by the opening 27 of the support bar 20 and the sides 92 and 94 of the base 82 engage the sides 22 and 24 of the support bar 20. In one embodiment, the clip edges 96 slide over the lower side edges 28 of the support bar 20 such that the tower member cannot be pulled away from the support bar 20 without spreading the sides 92 and 94 of the base 82 and thus disengaging the clip edges 96. While the tower member 80 is sufficiently secured to the support bar 20 by the combination of the projection 95, opening 27, and clip edges 96, the tower member 80 may be further secured to the support bar by the clip 78 that can be passed through the openings 100 of the sides 92 and 94 of the base 82. The clip 78 includes two flexible arms 79 having corresponding hooks 83 on their outer edges and nubs 81 that engage the openings 98 of side 92 when the clip 78 is fully pressed in place. To engage the clip 78, the arms 79 are directed through the openings 100, whereby the hooks bias the arms 79 inwardly through the openings 100 and then resiliently return to their original position. When the arms 79 and hooks 83 are directed through the openings 100 of side 94, the hooks engage the outer edge of side 94 and the nubs 81 engage the openings 98 of side 92 to further secure the tower member 80 to the support bar 20. The clip 78 can be removed by pressing the arms 79 towards each other such that the hooks can be pushed through the openings 100 in a reverse process. As discussed above regarding the locking device 35, the tower member 80 and clip 78 employ a snap-fit relationship for a number of reasons, including ease of manufacture, installation, removal, weight, and complexity. The material, therefore, are resiliently flexible, such as nylon, polyamide, or polyetherimide. Other materials known in the art, including thermoset materials, may form all or part of the tower member 80 and/or clip 78.

According to one embodiment, the tower member 80 also includes at least one attachment member 102 that is spaced from the proximate end 86 of the post 84 to help secure the elongate object 12 to the tower member. More specifically, the attachment member 102 includes a support surface 104 that is spaced from the post 84 by a separator 107 to define a channel, aperture, or recess 106. The recess 106 is preferably sized to receive a securing device T (FIGS. 1 and 5), such as a cable or "zip" tie that is known in the art. Cable ties typically include a flexible polymeric strap for circling a desired object or objects, and a buckle at one end of the strap to lock the strap into a loop. Advantageously, cable ties have adjustable diameters to accommodate a wide variety of diameters for objects being secured. Cable ties are also simple to fasten, and can be removed easily by cutting the cable tie with a sharp object.

According to one embodiment, the support surface 104 has a curved shape that is similar to the curved transition 110 at the proximate end 86 of the post 84. As such, an elongate object is supported by both the support surface 104 and the curved transition 110 and secured by the cable tie T by wrapping and securing the cable tie around the elongate object and separator 107. The radius of curvature of the support surface and curved transition can vary, and in one embodiment the radius of curvature is sized to receive elongate objects having a diameter between about 0.25-1.25 inches. It should be noted that FIG. 5 shows two attachment members extending from opposite sides of the post 84, which advantageously allows for elongate objects to be secured to the post along two sides of the post and thus doubling the capacity of elongate objects that can be secured to the post. The attachment member 102 is preferably integrally formed with the other elements of the tower member 80, although it maybe formed as an independent element and attached to the post 84 using conventional attachment techniques. In addition, the attachment member 102 may be formed of metallic, polymeric, composite, or carbon fiber materials, or combinations thereof.

The support system 10 also includes a stackable riser 112 that is designed to be slidably secured along with a length of the post 84 to further secure even more elongate objects to the tower member 80. In particular, the stackable riser 112 includes a body 114 that is sized to define an opening 115 that corresponds generally to the shape of the post 84. The stackable riser 112 also includes at least one support arm 116 that preferably has a curved support surface 118 for supporting an elongate object, such as having a curved surface similar to the curved transition 110 at the proximate end 86 of the post 84. According to one embodiment, an attachment member 102 is positioned adjacent the support arm 116 wherein the support surface 104 has a curved surface that is preferably similar to the curved surface of the support surface 118 and is spaced away from the arm by the separator 107 to define the channel or recess 106. Accordingly, an elongate object can be secured to the stackable riser 112 by resting the elongate object on the support surface 118 and support surface 104 and securing the elongate object to the stackable riser by wrapping and securing a cable tie T or the like around the elongate object and the separator 107. Of course, other arrangements for securing the elongate object are possible, such as eliminating the attachment member 102 and providing one or more openings in the support arm 116 for receiving a cable tie T or the like. In one advantageous embodiment, the stackable riser 112 includes two support arms 116 that allow for two elongate objects to be secured to the stackable riser.

Figure 6A:
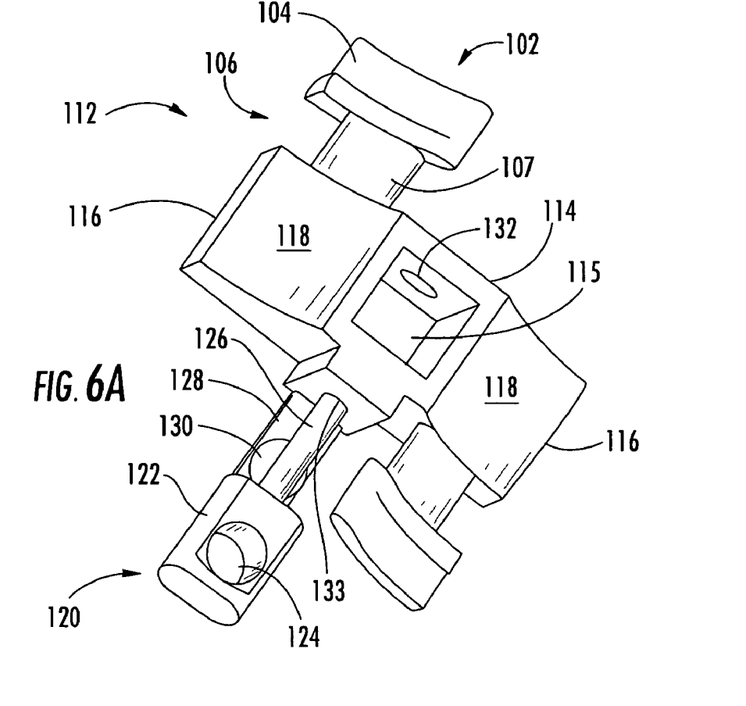
FIG. 6A is a perspective view of a stackable riser according to one embodiment of the present invention showing a registration member in an unlocked position.
Figure 6B:
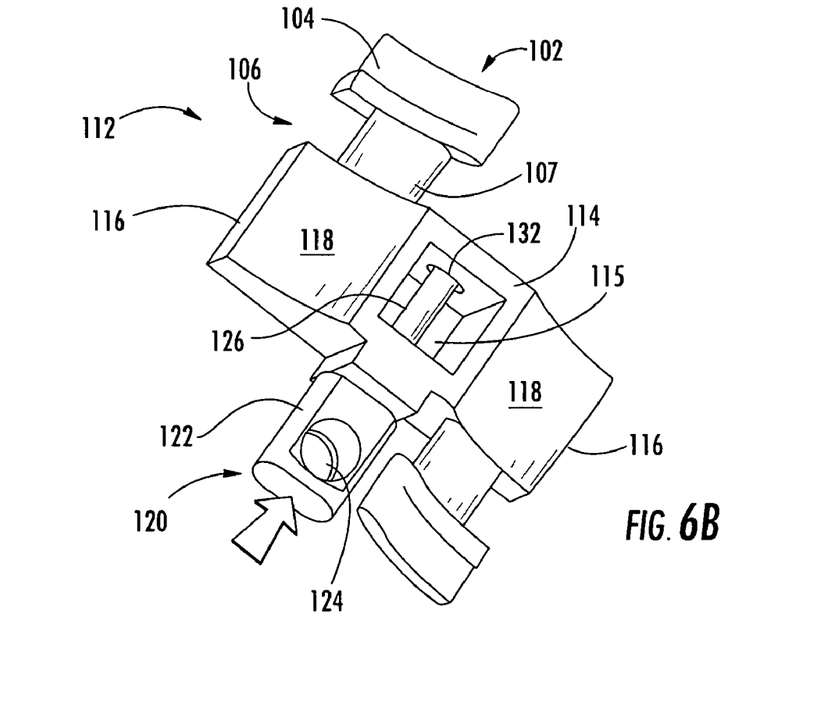
FIG. 6B is a perspective view of the stackable riser shown in FIG. 6A showing the registration member in a locked position.

According to one embodiment shown in FIGS. 6A and 6B, the stackable riser 112 also includes a registration member 120 having a grip 122 that defines an opening or recess 124 and includes a shaft 126, which is part of a captive assembly formed in part by the body 114 and grip 122. More particularly, the body 114 defines openings 132 and 133 for receiving the shaft 126. Likewise, the openings 90 defined by the post 84 are sized to receive the shaft 126 such that the shaft can be slidably inserted through the body 114 and post 84 to secure the stackable riser 112 at a selected registration position along the length of the shaft. The registration member 120 can be held in an inserted position by a detent mechanism that includes a detent base 128 and a detent 130 that is resiliently flexible when the registration member is moved from a free position (FIG. 6A) to a closed position (FIG. 6B). The registration member 120, however, may be biased in the closed position in a number of ways, such as utilizing a bias member, cam, or the like. Other alternative mechanisms and structures can be used to secure the stackable riser 112 to the post 84. For example, a threaded screw or similar device may extend through the opening 133 and into the opening 115 so that force can be applied to the screw and post to hold the stackable riser in place, or simply threaded into the opening 90 defined by the post. Other types of friction, tension, and compression techniques for securing the stackable riser 112 are within the scope of the support system 10.

By way of example and not limitation, one method of supporting an elongate object is to secure a tower member 80 along the length of the support bar 20 as described above, and then to secure one or more elongate objects to the tower member at the proximate end 86 of the post 84, such as by utilizing cable ties T and the attachment members 102. If further elongate objects are desired to be secured to the tower member 80, a stackable riser 112 can be slidably inserted over the post 84 and secured at one of the registration positions defined by the openings 90 along the length of the post 84. When the stackable riser 112 is sufficiently secured to the post 84, such as by engaging the shaft 126 of the registration member 120 through one or both openings 132 and 133 of the stackable riser and the opening (or openings) of the post 84, one or more elongate objects can be secured to the stackable riser by way of the attachment members 102 and cable ties T or the like. As such, stacks or layers of elongate objects can be spaced along the length of the post 84 by stacking or layering multiple stackable risers 112 along the post. As stated above, in one embodiment the post 84 is approximately 2.5 inches long and has a plurality of openings 90, such as about four openings, accepting a maximum of two or three stackable risers 112 depending on the length of the post 84. However, the post 84 length and number of openings 90 can vary according to the needs of the system 10.

In addition, the support bar 20 must be sized and constructed so that it can support multiple elongate objects being secured to the tower members 80 that are spaced along the length of the support bar. It is often necessary that multiple support bars are spaced along the run of the elongate objects in order to provide adequate support for the elongate objects and to prevent sagging. For example, multiple support bars 20 may be spaced approximately 10-30 inches apart along the length of the run, which in some cases may be between 50-100 feet or more. In such cases, it may be more advantageous to bundle the elongate objects and secure them in family groups or the like to stackable risers 112 and tower members 80, and then secure the tower members to multiple support bars 20 over the entire run of the elongate objects. The substantially completed assembly can then be rolled up and transported to the aircraft or other desired location and unrolled so that the remaining steps of securing the support bars 20 to the locking devices 35 can be performed quickly and efficiently. This is often advantageous in cramped quarters or the like where securing the elongate members and the stackable risers 112 may be difficult for the operator. Once the support bars 20 are secured to the locking devices 35, which are in turn secured to the desired structure, the support system 10 holds the elongate objects in place with little or no special parts and fasteners. Advantageously, if changes are required, such as replacing a particular elongate member with another, the support system 10 allows for quick and efficient changes without requiring custom parts that may be required under existing engineering guidelines. As such, the support system 10 greatly reduces the inventory of required parts as well as assembly and installation time. Further, the support system is highly robust and allows more flexibility while reducing corrective action and substitution time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A support system for an elongate object, the system comprising:
   an elongate support bar defining a length;
   a tower member that is releasably secured to the elongate support bar, the tower member including a member designed for contacting and adjusting along the length of the support bar such that the tower member can be secured to the elongate support bar at a plurality of positions along the length of the elongate support bar, and the tower member having a base and a post extending therefrom, the post defining;
   a stackable riser having a member for releasably securing the stackable riser to the post at a plurality of positions along the length of the post, wherein the stackable riser has at least one support arm extending away from the post and designed to support the elongate object; and
   a support bar locking device having an anchor member, a first connector member, and a second connector member, the first and second connector members being designed to releasably secure the support bar therebetween and to releasably secure the support bar to the anchor member.

2. A support system according to claim 1, wherein the stackable riser has at least one support arm extending away from the post of the tower member and an attachment member that is spaced away from the at least one support arm to define a recess therebetween, the recess sized to receive a securing device to secure the elongate object to the stackable riser.

3. A support system according to claim 1, wherein the support bar includes opposing sides, and the tower member includes corresponding sides extending from the base and designed to fit over the opposing sides of the support bar for preventing rotational movement of the tower member about the support bar.

4. A support system according to claim 1, wherein the support bar includes opposing sides and defines a plurality of openings spaced along its length, and the tower member includes corresponding sides designed to fit over the opposing sides of the support bar, the tower member also including a tab extending from the base thereof, the tab designed for registering in a selected one of the plurality of openings defined by the support bar.

5. A support system for an elongate object, the system comprising:
   an elongate support bar defining a length, wherein the support bar includes opposing sides and defines a plurality of openings spaced along its length;
   a tower member that is releasably secured to the elongate support bar, the tower member including a member designed for contacting and adjusting along the length of the support bar such that the tower member can be secured to the elongate support bar at a plurality of positions along the length of the elongate support bar, and the tower member having a base and a post extending therefrom, the post defining a length, wherein the tower member includes corresponding sides designed to fit over the opposing sides of the support bar, the tower member also including a tab extending from the base thereof, the tab designed for registering in a selected one of the plurality of openings defined by the support bar;
   a stackable riser having a member for releasably securing the stackable riser to the post at a plurality of positions along the length of the post; and
   a clip that extends through the sides of the tower member to at least partially secure the tower member to the support bar.

6. A support system according to claim 1, wherein the support bar has opposing sides defining respective lower side edges, and the tower member has corresponding opposing sides that extend beyond the lower side edges of the support bar and include respective clip edges designed to engage the lower side edges of the support bar for releasably securing the tower member to the support bar.

7. A support system for an elongate object, the system comprising:
   an elongate support bar;
   a tower member that is releasably secured to the elongate support bar, the tower member having a base and a post extending from the base in a direction away from the support bar, the post having a length and defining a finite plurality of distinct registration positions along the length of the post that define a finite plurality of distinct registration points; and
   a stackable riser defining a registration member designed to engage the post at each of the registration positions of the post such that the riser is configured to be releasably secured to the post at a select one of the plurality of registration positions along the length of the post, the stackable riser designed to engage and secure the elongate object to the support system, wherein the stackable riser has at least one support arm extending away from the post and designed to support the elongate object.

8. A support system according to claim 7, wherein the stackable riser includes an attachment member for supporting the elongate object.

9. A support system according to claim 7, wherein the stackable riser includes an attachment member that is spaced away from the at least one support arm and defines a recess therebetween, the recess sized to receive a securing device to secure the elongate object to the stackable riser.

10. A support system according to claim 7, further comprising a support bar locking device having an anchor member, a first connector member, and a second connector member, the first and second connector members being designed to releasably secure the support bar therebetween and to releasably secure the support bar to the anchor member.

11. A support system according to claim 7, wherein the support bar includes opposing sides, and the tower member includes corresponding sides extending from the base and designed to fit over the opposing sides of the support bar for preventing rotational movement of the tower member about the support bar.

12. A support system according to claim 7, wherein the support bar defines a plurality of openings spaced along its length, and the tower member includes a tab extending from the base thereof, the tab designed for registering in a selected one of the plurality of openings defined by the support bar.

13. A support system according to claim 7, wherein the tower member is at least partially secured to the support bar by a clip that extends through the base of the tower member.

14. A support system according to claim 7, wherein the support bar includes opposing sides and defines a plurality of openings spaced along its length, and the tower member includes corresponding sides designed for slidably engaging the sides of the support bar, the tower member also including a tab extending from the base thereof, the tab designed for registering in a selected one of the plurality of openings defined by the support bar.

15. A support system according to claim 14, further comprising a clip that extends through the sides of the tower member to at least partially secure the tower member to the support bar.

16. A support system according to claim 7, wherein the support bar has opposing sides defining respective lower side edges, and the tower member has corresponding opposing sides that extend beyond the sides of the support bar and include respective grip edges designed to engage the lower side edges of the support bar for releasably securing the tower member to the support bar.

17. A support system according to claim 7, wherein the proximate end of the tower member post has a curved transition to the base of the tower member, the transition designed for supporting the elongate object.

18. A support system according to claim 17, further comprising at least one attachment member positioned adjacent the curved transition defined by the tower member post.

19. A support system according to claim 7, wherein the tower member defines a plurality of openings along the length thereof that define the plurality of positions for releasably securing the stackable riser to the post.

20. A support system according to claim 19, wherein the stackable riser includes a registration member designed to extend through at least one of the plurality of openings defined by the tower member post for releasably securing the stackable riser to the post.

21. A support system according to claim 20, wherein the stackable riser includes a bias member for biasing the registration member in an extended position.

22. A method of supporting an elongate object, the method including the steps of:
providing an elongate support bar defining a plurality of registration points spaced along a length of the elongate support bar;
releasably fixedly securing a tower member along a length of the support bar, the tower member having a base designed to engage the support bar and having a post extending from the base and defining a plurality of spaced registration positions along the post, and the tower member including a member designed for registering with a selected one of the plurality of registration points defined by the support bar such that the tower member can be secured to the elongate support bar at a plurality of positions along the length of the elongate support bar;
releasably securing a stackable riser at a selected one of the registration positions defined by the post of the tower member; and
securing the elongate object to at least one of the stackable riser and the tower member by providing the stackable riser with a support arm and an attachment member that is spaced away from the support arm of the stackable riser to define a recess therebetween, and wherein the securing step includes wrapping a securing device around the elongate object and the recess to secure the elongate object to the stackable riser.

23. A method according to claim 22, wherein the providing step includes providing a support channel defining a plurality of openings spaced along its length, and wherein the tower member securing step includes registering a tab extending from the base of the tower member in a selected one of the openings defined by the support channel.

24. A method according to claim 22, wherein the stackable riser securing step includes engaging a registration member with the tower member post at the selected one of the registration positions defined by the tower member post.

25. A method of supporting an elongate object, the method including the steps of:
providing an elongate support bar defining a plurality of registration points spaced along a length of the elongate support bar;
releasably fixedly securing a tower member along a length of the support bar, the tower member having a base designed to engage the support bar and having a post extending from the base and defining a plurality of spaced registration positions along the post, and the tower member including a member designed for registering with a selected one of the plurality of registration points defined by the support bar such that the tower member can be secured to the elongate support bar at a plurality of positions along the length of the elongate support bar;
releasably securing a stackable riser at a selected one of the registration positions defined by the post of the tower member; and
securing the elongate object to at least one of the stackable riser and the tower member, wherein the elongate object securing step includes providing the tower member with an attachment member that is adjacent to yet spaced away from the post of the tower member to define a recess therebetween, and wherein the securing step includes wrapping a securing device around the elongate object and the recess to secure the elongate object to the tower member.

* * * * *

UNITED STATES PATENT AND TRADEMARK OFFICE
CERTIFICATE OF CORRECTION

| | | |
|---|---|---|
| PATENT NO. | : 7,654,492 B2 | Page 1 of 1 |
| APPLICATION NO. | : 10/838049 | |
| DATED | : February 2, 2010 | |
| INVENTOR(S) | : Balderama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-third Day of November, 2010

David J. Kappos
*Director of the United States Patent and Trademark Office*